United States Patent
Ramasamy et al.

(10) Patent No.: US 6,931,632 B2
(45) Date of Patent: Aug. 16, 2005

(54) INSTRUMENTATION OF CODE HAVING PREDICATED BRANCH-CALL AND SHADOW INSTRUCTIONS

(75) Inventors: Vinodha Ramasamy, Campbell, CA (US); Jenn-Yuan Tsai, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 668 days.

(21) Appl. No.: 10/005,302

(22) Filed: Nov. 8, 2001

(65) Prior Publication Data

US 2003/0088862 A1 May 8, 2003

(51) Int. Cl.7 .............................................. G06F 9/44
(52) U.S. Cl. ...................................... 717/130; 717/140
(58) Field of Search ................................. 717/140–144, 717/149–161, 130; 712/204–207, 216–219

(56) References Cited

U.S. PATENT DOCUMENTS

| | | | | |
|---|---|---|---|---|
| 6,098,165 | A | * | 8/2000 | Panwar et al. ............... 712/215 |
| 6,237,077 | B1 | * | 5/2001 | Sharangpani et al. ......... 712/24 |
| 6,622,300 | B1 | * | 9/2003 | Krishnaswamy et al. ... 717/130 |
| 6,721,875 | B1 | * | 4/2004 | McCormick et al. ....... 712/233 |
| 6,829,722 | B2 | * | 12/2004 | Lin ................................. 714/8 |
| 2002/0104074 | A1 | * | 8/2002 | Hundt et al. ................. 717/129 |

OTHER PUBLICATIONS

Tamches, Miller "Fine-grained dynamic instrumentation of commodity operating system kernels" 1999 AMC Operating Systems Design and Implementation pp. 117–130.*

* cited by examiner

Primary Examiner—Kakali Chaki
Assistant Examiner—Jason Mitchell

(57) ABSTRACT

Method and apparatus for instrumentation of an executable computer program that includes a predicated branch-call instruction followed by a call-shadow instruction. The predicated branch-call instruction and the call-shadow instruction is stored in a first bundle of instructions, which is followed by a second bundle. The predicated branch-call instruction is changed to a predicated branch instruction that targets a fifth bundle of instructions, and the predicate of the predicated branch instruction is the same as the predicate of the predicated branch-call instruction. Third, fourth, and fifth bundles are created to preserve program semantics. The third bundle is inserted following the first bundle and includes the call-shadow instruction. The fourth bundle is inserted following the third bundle and includes a branch instruction that targets the second bundle. The fifth bundle is inserted following the fourth bundle and includes a branch-call instruction that has a target address equal to the target address of the predicated branch-call instruction. Instrumentation instructions are then inserted.

12 Claims, 3 Drawing Sheets

INSTRUMENTATION OF CODE HAVING PREDICATED BRANCH-CALL AND SHADOW INSTRUCTIONS

FIELD OF THE INVENTION

The present invention generally relates to instrumentation of computer program code, and more particularly to handling a branch-call instruction in instrumented code.

BACKGROUND

Binary executable programs are "instrumented" or "profiled" to analyze program performance. The performance data that is gathered can be used to determine which source code might benefit most from improved coding. For example, if a particular function is called within a program loop and the loop is a hot spot during execution, it may be desirable to program the function in-line within the loop rather than as a function call.

For instrumentation to be useful, the semantics of the instrumented code must be the same as the semantics of the original, un-instrumented code. However, because instrumentation involves the insertion of probe instructions at various locations in the executable program, program semantics may be changed unless further precautions are taken.

In Hewlett Packard's IA-64 instruction architecture, instructions are grouped together in bundles by a scheduler within the compiler. The idea behind grouping instructions into bundles is to efficiently use the multiple functional units in an instruction processing unit in order to maximize instruction-level parallelism. The instructions in a bundle are dispersed to be executed in parallel. On the IA-64 architecture, each bundle has 3 slots for 3 instructions. A template field associated with each bundle restricts the type of instruction that can be issued from each slot. It will be appreciated that other very-long instruction word architectures also group multiple instructions into units which may be smaller or larger than the bundles described herein.

The IA-64 architecture includes a predicated branch-call instruction, which can be placed in any slot of a three-slot bundle. In a predicated branch-call instruction, the state of the predicate controls whether program control will be transferred to the target address of the branch-call instruction. If the branch is taken, upon completing execution of the code at the target, control is returned to the bundle that follows the bundle of the branch-call instruction. Thus, any instructions that follow the branch-call instruction in the branch-call's bundle are skipped if the branch is taken. If the branch is not taken, the instructions that follow the branch-call in the branch-call's bundle are executed. The instructions that follow the branch-call instruction in the branch-call's bundle are referred to as "call-shadow" instructions. If probe instructions are inserted in the proximity of a predicated branch-call instruction, the bundling of the branch-call and shadow instructions may change. That is, the branch-call instruction may reside in one bundle and the shadow instruction(s) in another bundle. In this case, if the branch-call instruction is taken, the call-shadow instruction(s) will be executed upon the return from the call target. Thus, the instrumented code will be semantically different from the un-instrumented code unless additional steps are taken.

A method and apparatus that address the aforementioned problems, as well as other related problems, are therefore desirable.

SUMMARY OF THE INVENTION

The invention supports instrumentation of an executable computer program that includes a predicated branch-call instruction followed by a call-shadow instruction. The predicated branch-call instruction and the call-shadow instruction is stored in a first bundle of instructions, which is followed by a second bundle in the original non-instrumented code. The predicated branch-call instruction is changed to a predicated branch instruction that targets a fifth bundle of instructions, and the predicate of the predicated branch instruction is the same as the predicate of the predicated branch-call instruction. Third, fourth, and fifth bundles are created to preserve program semantics. The third bundle is inserted following the first bundle and includes the call-shadow instruction. The fourth bundle is inserted following the third bundle and includes a branch instruction that targets the second bundle. The fifth bundle is inserted following the fourth bundle and includes a branch-call instruction that has a target address equal to the target address of the predicated branch-call instruction. Instrumentation instructions are then inserted. After the above transformations, instrumentation instructions can be inserted anywhere. The scheduler within the instrumenter ensures that the correct semantics are preserved.

Various example embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the invention supports instrumentation of executable program code that includes branch-call instructions and shadow instructions. In order to preserve program semantics, trampoline code segments are created, and the branch-call and corresponding shadow instructions are modified and bundled for use with the trampoline code segments. The executable program can then be instrumented without affecting program semantics. Those skilled in the art will recognize other embodiments and advantages of the invention.

Figure 1:
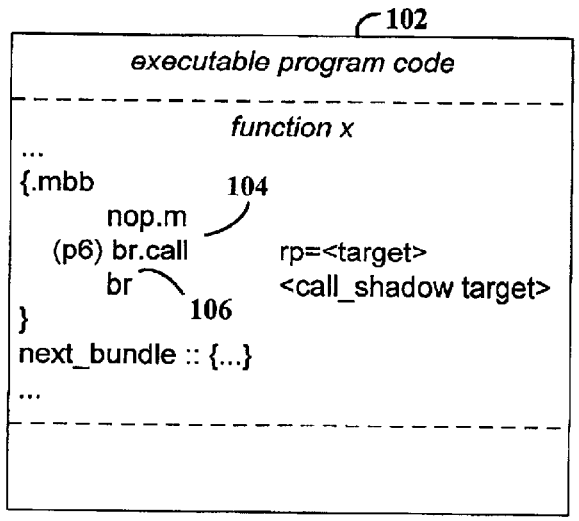
FIG. 1 illustrates an example code fragment within executable program code having a predicated branch-call instruction followed by a call-shadow instruction.

FIG. 1 illustrates an example code fragment within a function of an executable program code 102. The code fragment has a predicated branch-call instruction 104 followed by a call-shadow instruction 106. Predicated branch-call instruction 104 has as a predicate, p6, and a branch target of "target." The branch-call instruction performs a function call, which causes a new stack frame to be allocated. The address to which to return from the <target> via a return statement is specified in the rp register. That is, the last instruction in the function at <target> is a br.ret rp instruction. This resets the stack frame to the caller's stack frame and returns control to the label next_bundle following the branch-call instruction.

The example shadow instruction in the code fragment is a branch instruction. The branch instruction transfers control to call_shadow_target, without a return of control as with the branch-call instruction.

During program compilation, the scheduler logic within the compiler packs instructions into bundles. The branch-call instruction 104 and call-shadow instruction 106 are in bundle .mbb, and the following bundle is at label next_bundle. The general strategy is to group the instructions in a manner that maximizes parallel execution of the instructions as well as minimizing latency. The scheduler also inserts no-operation instructions (nop) in a bundle if needed. For example, a program may not have enough suitable instructions for instruction-level parallelism (ILP). In another example, the scheduler may be a very simple scheduler that simply fills a bundle by looking one instruction ahead; if the next instruction does not fit into the current bundle (due to template constraints) a nop is inserted. Nops are also used to force a latency between dependent instructions.

Figure 2:
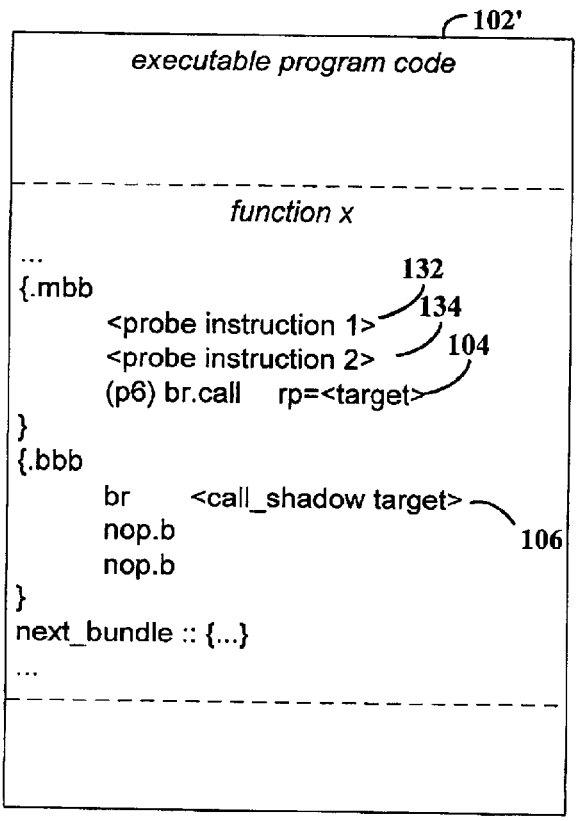
FIG. 2 illustrates the example code fragment of FIG. 1 that has been instrumented with probe instructions, resulting in a change in program semantics.

FIG. 2 illustrates the example code fragment of FIG. 1 that has been instrumented with probe instructions, resulting in a change in program semantics. Probe instructions 132 and 134 are bundled with the branch-call instruction 104 in bundle .mbb, and the call-shadow instruction is in bundle .bbb. If the state of the predicate p6 results in the function at <target> being called, control is returned from the function to the next bundle .bbb. Because the call-shadow instruction 106 is in the bundle that follows the bundle of the branch-call instruction, the call-shadow instruction will be executed independent of the state of the predicate p6. Thus, unless additional steps are taken the instrumentation of the executable program code changes the program semantics.

Figure 3:
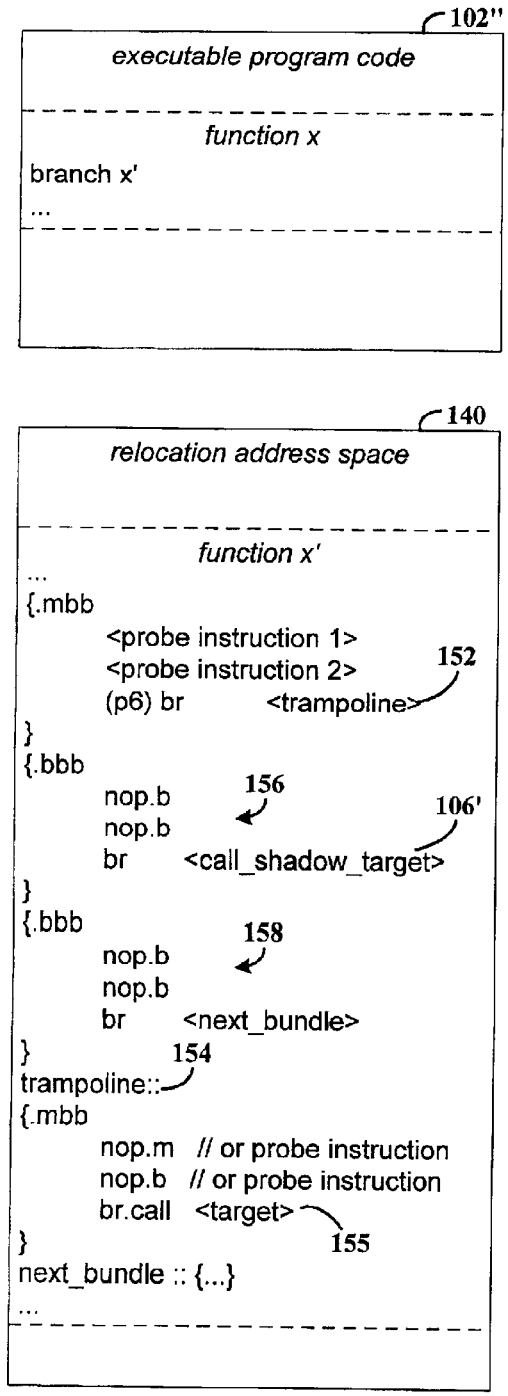
FIG. 3 illustrates an instrumented code fragment for a branch-call instruction in which a trampoline code segment has been inserted in-line to preserve program semantics.

FIG. 3 illustrates an instrumented code fragment for a branch-call instruction in which a trampoline code segment has been inserted in-line to preserve program semantics, in accordance with one embodiment of the invention. Executable program code 102" is created from the original executable program code 102 of FIG. 1. By modifying the original program code with an in-line trampoline code segment, stack unwinding through the instrumented code is supported.

When function x is instrumented, and the instrumented copy of the function, function x' is placed in relocation address space 140. The trampoline code segment that is created is part of the instrumented function x' and is stored along with the instrumented function in the relocation address space during instrumentation of the function. This supports instrumentation of a program without requiring recompilation. Thus, if the program contains call-shadow instructions, restructuring the code with trampoline code segments is performed during instrumentation. Note that the first instruction of function x in the executable program code 102" has been replaced with a branch instruction that targets function x' in the relocation address space. Thus, the new instrumented function x' is executed instead of the original version.

The example code segment has been restructured from the original code segment (FIG. 1). The original predicated branch-call instruction 104 is replaced with a predicated branch instruction 152 (no return). The new predicated branch instruction targets a new trampoline code segment 154, and the trampoline code segment includes a branch-call 155 to the <target> of the original predicated branch-call. Thus, transfer of control to <target> is still conditioned on the state of predicate p6, and return of control from the branch-call instruction is to the label next_bundle.

Two additional bundles are created. Bundle 156 includes the call-shadow instruction 106', and bundle 158 branches to the label next_bundle. If predicate p6 in the predicted branch instruction 152 evaluates to false, program control continues with execution of the instructions in bundle 156, which includes the call-shadow instruction 106'. It will be appreciated that the present invention also handles code where there are more than one call-shadow instruction. For example, if the predicated branch-call instruction is in slot 0, then both the instructions in slot 1 and slot2 are call-shadow instructions and are placed in a bundle such as bundle 156. If the call-shadow instruction 106' was an instruction other than a branch, program control would continue with the instructions in bundle 158. Thus, bundle 158 includes a branch instruction that targets next_bundle so that the branch-call instruction 155 is not executed.

The text .mbb and .bbb that begin the bundles designate bundle templates. The .mbb template specifies placement of an M-unit instruction in slot 0 and placement of B-unit instructions in slots 1 or slot 2 of the bundle. An M-unit instruction is a memory unit instruction, which is dispersed to the memory port in the hardware. A B-unit instruction is a branch unit instruction, which is executed in the branch unit of the hardware.

Figure 4:
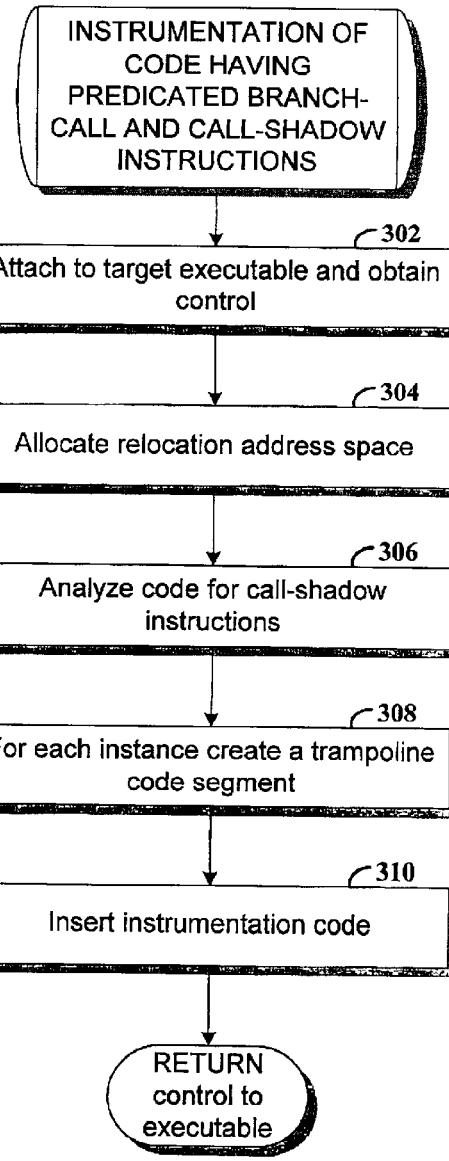
FIG. 4 is a flowchart of an example process for instrumentation of executable program code having predicated branch-call instructions and associated call-shadow instructions.

FIG. 4 is a flowchart of an example process for instrumentation of executable program code having predicated branch-call instructions and associated call-shadow instructions. At step 302, an instrumentation process attaches to a target executable application and obtains control. Those skilled in the art will appreciate that this step can be accomplished using known techniques. At step 304, the process allocates and maps shared memory for use by the instrumentation process and the executable application. In one embodiment, the process for allocating and mapping shared memory is implemented consistent with the teachings of the patent application entitled, "DYNAMIC INSTRUMENTATION OF AN EXECUTABLE PROGRAM", by Hundt et al., filed on Apr. 11, 2001, and having patent application Ser. No. 09/833,248, the contents of which are incorporated herein by reference.

When a function is instrumented, at step 306, the function is analyzed for the presence of a branch-call instruction (br.call) in slot 0 or slot 1 of a bundle, where the branch-call instruction is followed by an instruction other than a NOP in the same bundle. For each such instance, at step 308 the function is modified to preserve the program semantics when the code is instrumented. For example, the code is modified consistent with the example code fragment in FIG. 3.

After restructuring the branch-call and call-shadow instructions, the function is instrumented with probe instructions, as shown by step 310. The instrumented function, for example, function x', which includes the trampoline code segment(s), is stored in relocation address space 140. The scheduler logic in the instrumenter packs the transformed instructions of the new function x' into the bundles illustrated in FIG. 3. NOP instructions are included if needed. Branch-call instructions are always placed in slot 2 of a bundle (where slots are numbered 0,1, and 2) to ensure that no new call shadow instructions are inadvertently created. Control is then returned to the instrumented executable program.

Figure 5:
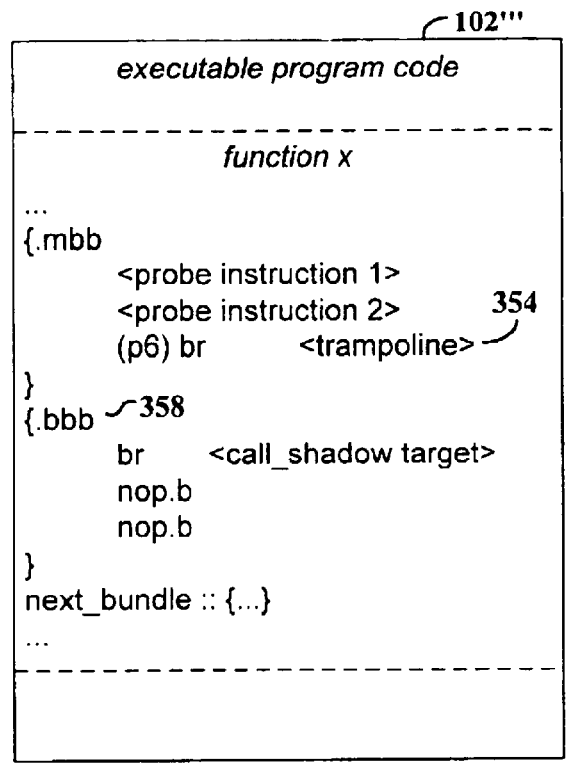
FIG. 5 illustrates an instrumented code fragment for branch-call and call-shadow instructions in which a trampoline code segment has been inserted in relocation address space to preserve program semantics.
Figure 5:
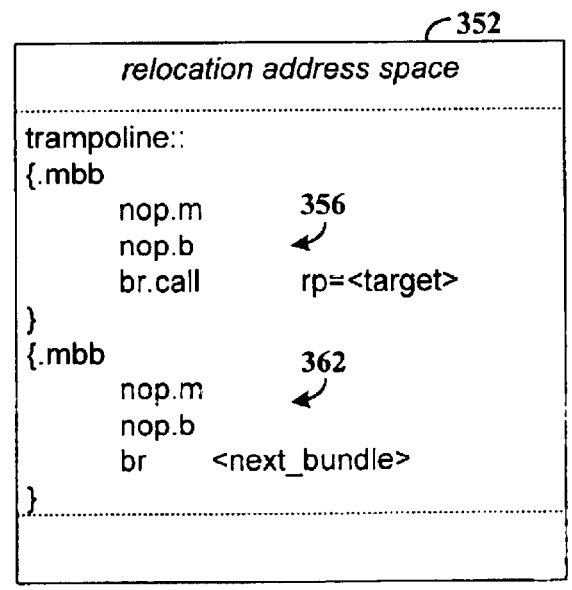

FIG. 5 illustrates an instrumented code fragment for branch-call and call-shadow instructions in which a trampoline code segment is inserted in relocation address space to preserve program semantics, in accordance with another embodiment of the invention. Instead of creating an in-line trampoline code segment as illustrated in FIG. 2, the trampoline code segment is created in relocation address space 352.

The original predicated branch-call instruction 104 is replaced with a predicated branch instruction 354 that targets the trampoline code segment 356. The original call-shadow instruction 106 is moved to a new bundle 358 that follows the bundle with the predicated branch instruction 354.

The trampoline code segment 356 is created in relocation address space 352 with a branch-call instruction that targets the target of the original predicated branch-call instruction 104. Along with the trampoline code segment 356, bundle 362 is created with a branch instruction to return control to the next_bundle.

In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for instrumentation of an executable computer program that includes a first bundle of instructions followed by a second bundle, the first bundle having a predicated branch-call instruction followed by a call-shadow instruction, wherein the predicated branch-call instruction conditionally transfers control to a target address in response to a state of an associated predicate and returns control to the second bundle, comprising:

changing the predicated branch-call instruction to a predicated branch instruction that targets a fifth bundle, wherein the predicate of the predicated branch instruction is the predicate of the predicated branch-call instruction;

creating a third bundle and inserting the third bundle after the first bundle, the third bundle including the call-shadow instruction;

creating a fourth bundle and inserting the fourth bundle after the third bundle, the fourth bundle including a branch instruction that targets the second bundle;

creating the fifth bundle and inserting the fifth bundle after the fourth bundle, the fifth bundle including a branch-call instruction having a target address equal to the target address of the predicated branch-call instruction; and inserting instrumentation instructions in selected ones of the bundles.

2. The method of claim 1, further comprising:

identifying each instance of a predicated branch-call instruction followed by a call-shadow instruction;

creating respective sets of the third, fourth, and fifth bundles; and changing each predicated branch-call instruction to a predicated branch instruction that targets the respective fifth bundle, wherein a predicate of the predicated branch instruction is the predicate of the predicated branch-call instruction.

3. The method of claim 2, further comprising:

allocating relocation address space; and storing the respective sets of the third, fourth, and fifth bundles in the relocation address space.

4. The method of claim 3, further comprising:

identifying in selected functions of the executable program each instance of a predicated branch-call instruction followed by a call-shadow instruction; and creating instrumented versions of the selected function in the relocation address space.

5. The method of claim 4, wherein the executable program code occupies a first address space, the method further comprising replacing a first instruction of each of the selected functions in the first address space with a branch instruction to a corresponding instrumented version of the function in the relocation address space.

6. The method of claim 1, further comprising:

allocating relocation address space; and identifying in selected functions of the executable program each instance of a predicated branch-call instruction followed by a call-shadow instruction; and creating instrumented versions of the selected function in the relocation address space.

7. The method of claim 6, wherein the executable program code occupies a first address space, the method further comprising replacing a first instruction of each of the selected functions in the first address space with a branch instruction to a corresponding instrumented version of the function in the relocation address space.

8. An apparatus far instrumentation of an executable computer program that includes a first bundle of instructions followed by a second bundle, the first bundle having a predicated branch-call instruction followed by a call-shadow instruction, wherein the predicated branch-call instruction conditionally transfers control to a target address in response to a state of an associated predicate and returns control to the second bundle, comprising:

means for changing the predicated branch-call instruction to a predicated branch instruction that targets a fifth bundle, wherein the predicate of the predicated branch instruction is the predicate of the predicated branch-call instruction;

means for creating a third bundle and inserting the third bundle after the first bundle, the third bundle including the call-shadow instruction;

means for creating a fourth bundle and inserting the fourth bundle after the third bundle, the fourth bundle including a branch instruction that targets the second bundle;

means for creating the fifth bundle and inserting the fifth bundle after the fourth bundle, the fifth bundle including a branch-call instruction having a target address equal to the target address of the predicated branch-call instruction; and means for inserting instrumentation instructions in selected ones of the bundles.

9. A computer-implemented method for instrumentation of an executable computer program that includes a first bundle of instructions having a predicated branch-call instruction followed by a call-shadow instruction, wherein the predicated branch-call instruction conditionally transfers control to a target address in response to a state of an associated predicate and returns control to a second bundle that follows the first bundle, comprising:

inserting in the executable program a trampoline code segment that includes a third bundle followed by a fourth bundle, the third bundle including an unpredicated branch-call instruction having the target address of the predicated branch-call instruction, and the fourth bundle having an unpredicated branch instruction having a target address that references the second bundle;

changing the target address of the predicated branch-call instruction to reference the third bundle; and inserting instrumentation code in the program whereby the predicated branch-call instruction and the call shadow instruction are stored in different bundles.

10. The method of claim 9, further comprising:

allocating relocation address space; and storing the trampoline code segment in the relocation address space.

11. The method of claim 10, further comprising:

identifying each instance of a predicated branch-call instruction followed by a call-shadow instruction; and creating a respective trampoline code segment for each instance of a predicated branch-call instruction followed by a call-shadow instruction.

12. An apparatus for instrumentation of an executable computer program that includes a first bundle of instructions having a predicated branch-call instruction followed by a call-shadow instruction, wherein the predicated branch-call instruction conditionally transfers control to a target address in response to a state of an associated predicate and returns control to a second bundle that follows the first bundle, comprising:

means for inserting in the executable program a trampoline code segment that includes a third bundle followed by a fourth bundle, the third bundle including an unpredicated branch-call instruction having the target address of the predicated branch-call instruction, and the fourth bundle having an unpredicated branch instruction having a target address that references the second bundle;

means for changing the target address of the predicated branch-call instruction to reference the third bundle; and means for inserting instrumentation code in the program whereby the predicated branch-call instruction and the call-shadow instruction are stored in different bundles.

* * * * *